US008392366B2

(12) United States Patent
Najork

(10) Patent No.: US 8,392,366 B2
(45) Date of Patent: Mar. 5, 2013

(54) CHANGING NUMBER OF MACHINES RUNNING DISTRIBUTED HYPERLINK DATABASE

(75) Inventor: Marc A. Najork, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 701 days.

(21) Appl. No.: 11/512,887

(22) Filed: Aug. 29, 2006

(65) Prior Publication Data

US 2008/0059507 A1    Mar. 6, 2008

(51) Int. Cl.
*G06F 7/00*    (2006.01)
*G06F 17/00*    (2006.01)
(52) U.S. Cl. .......................... 707/617; 707/649; 707/654
(58) Field of Classification Search .................. 707/617, 707/649, 654
See application file for complete search history.

(56) References Cited

U.S. PATENT DOCUMENTS

| | | | |
|---|---|---|---|
| 3,109,186 A | 11/1963 | Glenn | |
| 3,142,485 A | 7/1964 | Jacobsen | |
| 3,424,133 A | 1/1969 | Brady | |
| 3,517,930 A | 6/1970 | Jacobsen | |
| 3,786,526 A | 1/1974 | Ausseil | |
| 4,411,422 A | 10/1983 | Solloway | |
| 4,416,451 A | 11/1983 | Solloway | |
| 4,565,369 A | 1/1986 | Bedgood | |
| 4,721,300 A | 1/1988 | Guzman | |
| 5,011,137 A | 4/1991 | Murphy | |
| 5,031,904 A | 7/1991 | Solloway | |
| 5,183,424 A | 2/1993 | Field | |
| 5,326,296 A | 7/1994 | De Jesus | |
| 6,049,799 A | 4/2000 | Mangat et al. | 707/10 |
| 6,098,081 A | 8/2000 | Heidorn et al. | |
| 6,112,203 A | 8/2000 | Bharat et al. | 707/5 |
| 6,253,198 B1 | 6/2001 | Perkins | 707/3 |
| 6,301,614 B1 | 10/2001 | Najork et al. | 709/223 |
| 6,321,242 B1 | 11/2001 | Fogg et al. | 707/513 |
| 6,338,059 B1 | 1/2002 | Fields et al. | 707/4 |
| 6,363,396 B1 * | 3/2002 | Klots et al. | 1/1 |
| 6,493,729 B2 | 12/2002 | Gusler et al. | |
| 6,505,191 B1 | 1/2003 | Baclawski | 707/3 |
| 6,578,078 B1 | 6/2003 | Smith et al. | 709/224 |
| 6,601,066 B1 | 7/2003 | Davis-Hall | 707/5 |
| 6,606,653 B1 | 8/2003 | Ackerman, Jr. et al. | 709/219 |
| 6,638,314 B1 | 10/2003 | Meyerzon et al. | 715/513 |
| 6,681,309 B2 | 1/2004 | Szendy et al. | |

(Continued)

FOREIGN PATENT DOCUMENTS

WO    WO 97/42576    11/1997

OTHER PUBLICATIONS

Heimeriks, G. et al., "Analyzing Hyperlinks Networks: The Meaning of Hyperlink Based Indicators of Knowledge", *Cybermetrics, Issue Contents*, 2006, 10, 19 pages, http://www.cindoc.csic.es/cybermetrics/articles/v10i1p1.pdf.

(Continued)

*Primary Examiner* — Mariela Reyes
(74) *Attorney, Agent, or Firm* — Woodcock Washburn LLP

(57) ABSTRACT

The number of machines in a cluster of computers running a distributed database, such as a scalable hyperlink datastore or a distributed hyperlink database, may be changed such that machines may be added or removed. The data is not repartitioned all at once. Instead, only new and merged data stores are mapped to the changed set of machines. A database update mechanism may be leveraged to change the number of machines in a distributed database.

18 Claims, 12 Drawing Sheets

U.S. PATENT DOCUMENTS

| | | | |
|---|---|---|---|
| 6,754,873 B1 | 6/2004 | Law et al. | 715/501.1 |
| 6,772,141 B1 | 8/2004 | Pratt et al. | |
| 6,820,085 B2 | 11/2004 | Nishizawa et al. | 707/10 |
| 6,886,129 B1* | 4/2005 | Raghavan et al. | 715/205 |
| 6,931,397 B1 | 8/2005 | Sundaresan | 707/5 |
| 6,954,776 B1 | 10/2005 | Cruanes et al. | 709/201 |
| 7,032,168 B1 | 4/2006 | Gerace et al. | |
| 7,114,128 B2 | 9/2006 | Koppolu et al. | |
| 7,139,933 B2 | 11/2006 | Hsu et al. | |
| 7,158,926 B2* | 1/2007 | Kampe | 703/22 |
| 7,277,929 B2 | 10/2007 | Ohara | |
| 7,376,724 B2 | 5/2008 | Goyal et al. | |
| 7,627,777 B2 | 12/2009 | Najork | |
| 2001/0011335 A1 | 8/2001 | Matthews et al. | |
| 2002/0004803 A1 | 1/2002 | Serebrennikov | 707/513 |
| 2002/0091727 A1 | 7/2002 | Kerr et al. | 707/501.1 |
| 2002/0133697 A1 | 9/2002 | Royer et al. | 707/5 |
| 2002/0152230 A1 | 10/2002 | Gusler et al. | |
| 2003/0033378 A1 | 2/2003 | Needham et al. | 709/218 |
| 2003/0093412 A1 | 5/2003 | Urkumyan | 707/3 |
| 2003/0101236 A1 | 5/2003 | Ohara | 709/218 |
| 2004/0044659 A1 | 3/2004 | Judd et al. | |
| 2004/0210826 A1* | 10/2004 | Najork | 715/501.1 |
| 2004/0243673 A1 | 12/2004 | Goyal et al. | 709/204 |
| 2005/0005188 A1 | 1/2005 | Hsu et al. | 714/2 |
| 2005/0036482 A1* | 2/2005 | Goroshevsky et al. | 370/352 |
| 2005/0256860 A1* | 11/2005 | Eiron et al. | 707/4 |
| 2007/0136279 A1 | 6/2007 | Zhou et al. | |
| 2007/0250480 A1 | 10/2007 | Najork | |

OTHER PUBLICATIONS

Dipl. Ing. Wolfgang Hoschek, "A Unified Peer-to-Peer Database framework for Xqueries over Dynamic Distributed Content and Its Application for Scalable Service Discovery", Mar. 2002, http://www.big.tuwien.ac.at/research/publications/phdtheses/hoschek.pdf, 157 pages.

Palmer, C.R. et al., "ANF: A Fast and Scalable Tool for Data Mining in Massive Graphs", *SIGKDD*, 2002, 81-90, http://delivery.acm.org.

Weiss, R. et al., "HyPursuit: A Hierarchical Network Search Engine that Exploits Content-Link Hypertext Clustering", *Hypertext*, 1996, 180-193, http://delivery.acm.org.

Adler, M. et al., "Towards Compressing Web Graphs", *CMPSCI Technical Report*, 2000, 5 pages.

Arasu, A. et al., "PageRank Computation and the Structure of the Web: Experiments and Algorithms", *Technical Report, IBM Almaden Research Center*, Nov. 2001, 3 pages.

Bharat, K. et al., "Improved Algorithms for Topic Distillation in a Hyperlinked Environment", *21st ACM SIGIR Conference on Research and Development in Information Retrieval*, 1998, 5 pages.

Bharat, K. et al., "The Connectivity Server: Fast access to linkage information on the Web", *Computer Networks and ISDN Systems*, 1998, 30, 469-477.

Brin, S. et al., "The Anatomy of a large-scale hypertextual Web search engine", *computer Networks and ISDN Systems*, 1998, 30, 107-117.

Chen, Y-Y. et al., "I/O-Efficient Techniques for Computing Pagerank", *CIKM*, 2002, 5 pages.

Cormen, T.H. et al., "Introduction to Algorithms", *MIT Press/McGraw-Hill*, 1990, 337-344.

Ding, C. et al., "PageRank, HITS and a Unified Framework for Link Analysis", *Lawrence Berkeley National Laboratory*, Nov. 2001, 1-12.

Fielding, R.T., "Maintaining Distributed Hypertext Infostructures: Welcome to MOMspider's Web", *Proceedings of the 1st International Conference on the World Wide Web*, 1994, 11 pages, http://scholar.google.com.

Haveliwala, T. H. et al., "Efficient Computation of PageRank", Oct. 18, 1999, 1-15.

Hoschek, W., "A Database for Dynamic Distributed Content and its Application for Service and Resource Discovery", *Proc. of the Int'l. IEEE Symposium on Parallel and Distributed Computing (ISPDC 2002)*, Iasi, Romania, Jul. 2002, 16 pages.

Hsu, C-L. et al., "A Web Database Application Model for Software Maintenance", http://www.scit.wlv.ac.uk/~f9679743/more-disc-space/public_html/journals/database, 1999, 7 pages.

Kappe, F., "A Scalable Architecture for Maintaining Referential Integrity in Distributed Information Systems", ftp://ftp.iicm.edu/pub/papers/p-flood.pdf, 1995, 21 pages.

Kleinberg, J.M. "Authoritative Sources in a Hyperlinked Environment", *Proceedings of the ACM-SIAM Symposium on Discrete Algorithms*, 1998, 1-31.

Lempel, R. et al., "The Stochastic Approach for Link-Structure Analysis (SALSA) and the TKC Effect", *Department of Computer Science, The Technion*, 1-39.

"The PageRank Citation Ranking: Bringing Order to the Web", Jan. 29, 1998, 1-17.

Pitkow, J.E. et al., "Supporting the Web: A Distributed Hyperlink Database System", *Fifth International World Wide Web Conference*, 1996, http://pitkow.com/docs/1996-WWW5-HyperlinkDatabase.pdf, 1-10.

Randall, K.H. et al., "The Link Database: Fast Access to Graphs of the Web", *SRC Research Report*, www.research.compaq.com/SRC, Nov. 16, 2001, 1-16.

Suel, T. et al., "Compressing the Graph Structure of the Web", *IEEE Computer Society*, 2001, pp. 1-10.

Veritas Software Corporation, Veritas Volume Manager 3.5, Aug. 2002, 247-258.

U.S. Appl. No. 11/378,930: Non-Final Office Action dated Jul. 21, 2008.

U.S. Appl. No. 11/378,930: Final Office Action dated Jan. 8, 2009.

U.S. Appl. No. 11/378,930: Notice of Allowance dated Jul. 1, 2009.

U.S. Appl. No. 11/378,930: Notice of Allowance dated Sep. 2, 2009.

\* cited by examiner

| url$_0$ | uid$_0$ = baseuid(g,p)+0 |
|---|---|
| url$_1$ | uid$_1$ = baseuid(g,p)+1 |
| url$_2$ | uid$_2$ = baseuid(g,p)+2 |
| url$_3$ | uid$_3$ = baseuid(g,p)+3 |
| url$_4$ | uid$_4$ = baseuid(g,p)+4 |
| url$_5$ | uid$_5$ = baseuid(g,p)+5 |
| url$_6$ | uid$_6$ = baseuid(g,p)+6 |
| url$_7$ | uid$_7$ = baseuid(g,p)+7 |
| url$_8$ | uid$_8$ = baseuid(g,p)+8 |
| url$_9$ | uid$_9$ = baseuid(g,p)+9 |

URL store tile UT$^g_p$

FIG. 10

| uid$_x$ → (uid$_{fx0}$, uid$_{fx1}$, ...) |
|---|
| uid$_y$ → (uid$_{fy0}$, uid$_{fy1}$, ...) |
| uid$_z$ → (uid$_{fz0}$, uid$_{fz1}$, ...) |
| uid$_0$ → (uid$_{f00}$, uid$_{f01}$, ...) |
| uid$_1$ → (uid$_{f10}$, uid$_{f11}$, ...) |
| uid$_2$ → (uid$_{f20}$, uid$_{f21}$, ...) |
| uid$_3$ → (uid$_{f30}$, uid$_{f31}$, ...) |
| uid$_4$ → (uid$_{f40}$, uid$_{f41}$, ...) |
| uid$_5$ → (uid$_{f50}$, uid$_{f51}$, ...) |
| uid$_6$ → (uid$_{f60}$, uid$_{f61}$, ...) |
| uid$_7$ → (uid$_{f70}$, uid$_{f71}$, ...) |
| uid$_8$ → (uid$_{f80}$, uid$_{f81}$, ...) |
| uid$_9$ → (uid$_{f90}$, uid$_{f91}$, ...) |

Forward link store tile FT$^g_p$

FIG. 11

| uid$_x$ → (uid$_{bx0}$, uid$_{bx1}$, ...) |
|---|
| uid$_y$ → (uid$_{by0}$, uid$_{by1}$, ...) |
| uid$_z$ → (uid$_{bz0}$, uid$_{bz1}$, ...) |
| uid$_0$ → (uid$_{b00}$, uid$_{b01}$, ...) |
| uid$_1$ → (uid$_{b10}$, uid$_{b11}$, ...) |
| uid$_2$ → (uid$_{b20}$, uid$_{b21}$, ...) |
| uid$_3$ → (uid$_{b30}$, uid$_{b31}$, ...) |
| uid$_4$ → (uid$_{b40}$, uid$_{b41}$, ...) |
| uid$_5$ → (uid$_{b50}$, uid$_{b51}$, ...) |
| uid$_6$ → (uid$_{b60}$, uid$_{b61}$, ...) |
| uid$_7$ → (uid$_{b70}$, uid$_{b71}$, ...) |
| uid$_8$ → (uid$_{b80}$, uid$_{b81}$, ...) |
| uid$_9$ → (uid$_{b90}$, uid$_{b91}$, ...) |

Backward link store tile BT$^g_p$

FIG. 12

CHANGING NUMBER OF MACHINES RUNNING DISTRIBUTED HYPERLINK DATABASE

BACKGROUND

Web search services allow users to submit queries, and in response, they return a set of links to web pages that satisfy the query. Because a query may potentially produce a large number of results, search engines typically display the results in a ranked order. There are many ways to rank-order the links resulting from a query, including content-based ranking, usage-based ranking, and link-based ranking. Content-based ranking techniques determine how relevant the content of a document is to a particular query. Usage-based ranking techniques monitor which result links users actually follow, and boost the rank of these result links for subsequent queries. Link-based ranking techniques examine how many other web pages link to a particular web page, and assign higher ranks to pages with many incoming links. Examples of link-based ranking algorithms include PageRank, HITS, and SALSA.

Link-based ranking algorithms view each page on the web as a node in a graph, and each hyperlink from one page to the other as a directed edge between the two corresponding nodes in the graph. There are two variants of link-based ranking algorithms: query-independent ones (such as PageRank) that assign an importance score (independent of any particular query) to all the web pages in the graph, and query-dependent ones (such as HITS and SALSA) that assign a relevance score with respect to a particular query to each web page returned in the result set of a query. Query-independent scores can be computed prior to the arrival of any query, while query-dependent scores can only be computed once the query has been received.

Users expect to receive answers to a query within a few seconds, and all major search engines strive to provide results in less than one second. Therefore, any query-dependent ranking algorithm desirably has to compute scores for all pages in the result set in under one second, and ideally within less than 100 milliseconds. However, the seek time of modern hard disks is on the order of 10 milliseconds, making them too slow to be used as a medium to store the web graph. In order to meet the time constraints, the web graph (or at least the most frequently used portions of it) has to be stored in memory, such as RAM, as opposed to disk storage.

A graph induced by the web pages stored in the corpus of a major search engine is extremely large. For example, the MSN Search corpus contains 5 billion web pages, which in turn contain on the order of 100 billion hyperlinks; the Google corpus is believed to contain about 20 billion web pages containing on the order of 400 billion hyperlinks. A web graph of this size cannot be stored in the memory of a single machine, even if the most effective compression techniques are applied. Therefore, the graph is distributed ("partitioned") across multiple machines. Distributing the graph is orthogonal to compressing it; in practice, one does both.

U.S. patent application Ser. No. 10/413,645, filed Apr. 15, 2003, entitled "System and method for maintaining a distributed database of hyperlinks", and incorporated herein by reference in its entirety, describes a scheme for distributing a database of hyperlinks across multiple machines, such as database processors. An embodiment is referred to as the Scalable Hyperlink Store, or SHS (used herein to refer to any distributed hyperlink database).

SHS represents a web graph as three databases or "stores": a uniform resource locator (URL) store, a forward link store, and a backward link store. Each store is partitioned across multiple machines; each machine will hold corresponding fractions ("partitions") of each store in main memory to serve queries.

Adding or removing machines to a distributed database, such as SHS, is a difficult problem, because it requires the data that is being partitioned across the machines in the cluster to be repartitioned.

SUMMARY

The number of machines in a cluster of computers running a distributed hyperlink database, such as a Scalable Hyperlink Store (SHS), may be changed. The data is not repartitioned all at once. Instead, only new and merged data stores are mapped to the changed set of machines. A database update mechanism, such as that described in U.S. patent application 11/408,283, filed Apr. 19, 2006, entitled "Incremental update scheme for hyperlink database", and incorporated herein by reference in its entirety, may be used.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 10 shows the content of example URL store tiles.

FIG. 11 shows the content of example forward link store tiles.

FIG. 12 shows the content of example backward link store tiles.

DETAILED DESCRIPTION

Web pages are identified by uniform resource locators (URLs). A typical URL is of the form http://xyz.com/a/b, where xyz.com (the "host" of the URL) identifies the web server providing this web page, and /a/b (the "path" of the URL) identifies the page itself (relative to web server xyz.com). Major search engines index pages drawn from on the order of 50 million hosts. As used herein, host(u) denotes the host of URL u.

Figure 1:
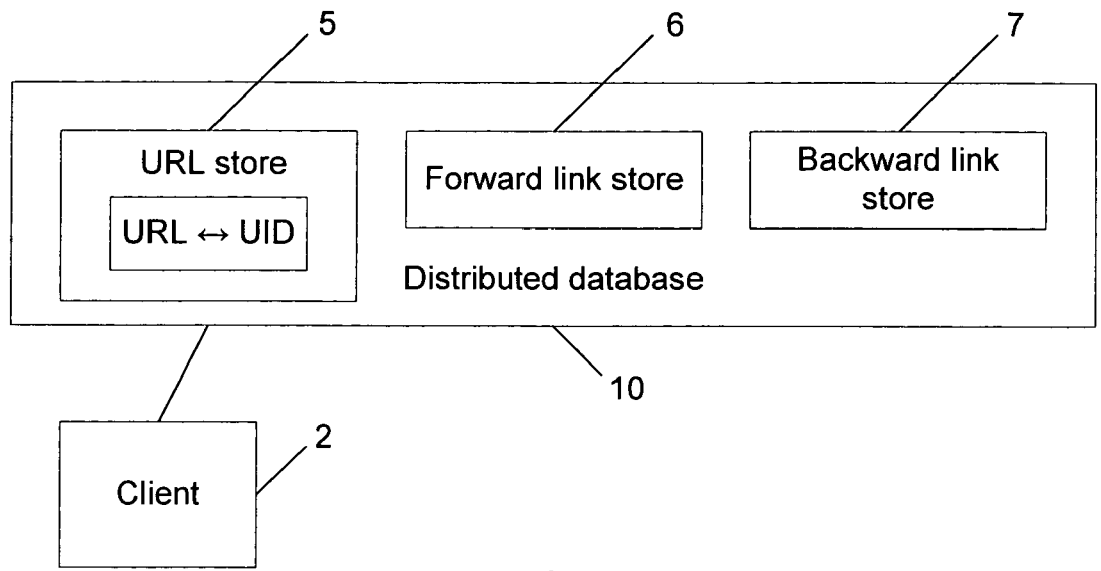
FIG. 1 is a high level block diagram of an example distributed database system.

URLs are on average about 80 characters long. In order to compress the web graph efficiently, a distributed database for maintaining hyperlinks stores hyperlinks not as URLs, but rather as 64-bit integers called unique identifiers (UIDs). FIG. 1 is a high level block diagram of an example distributed database system. There is a one-to-one mapping between URLs and UIDs. This mapping is maintained by a URL store 5 in the distributed database system 10. The URL store 5 provides a method UrlToUid for mapping a URL to its corresponding UID, and a method UidToUrl for mapping a UID back to its corresponding URL.

In addition to the URL store 5, a distributed database system 10 for maintaining hyperlinks maintains a forward link store 6 and a backward link store 7. The forward link store 6 provides a method, GetLinks, which, given a UID (representing a URL), returns a list of the UIDs (representing URLs) that the given UID links to. Similarly, the backward link store 7 provides a method, GetLinks, which, given a UID, returns a list of UIDs that link to the given UID. A client 2 may interact with the servers that are comprised within the database system 10.

Describing the three stores in terms familiar to a mathematician, the URL store contains the node set of the web graph, the forward link store contains the adjacency matrix induced by the edge set, and the backward link store contains the transpose of the adjacency matrix.

Figure 2:
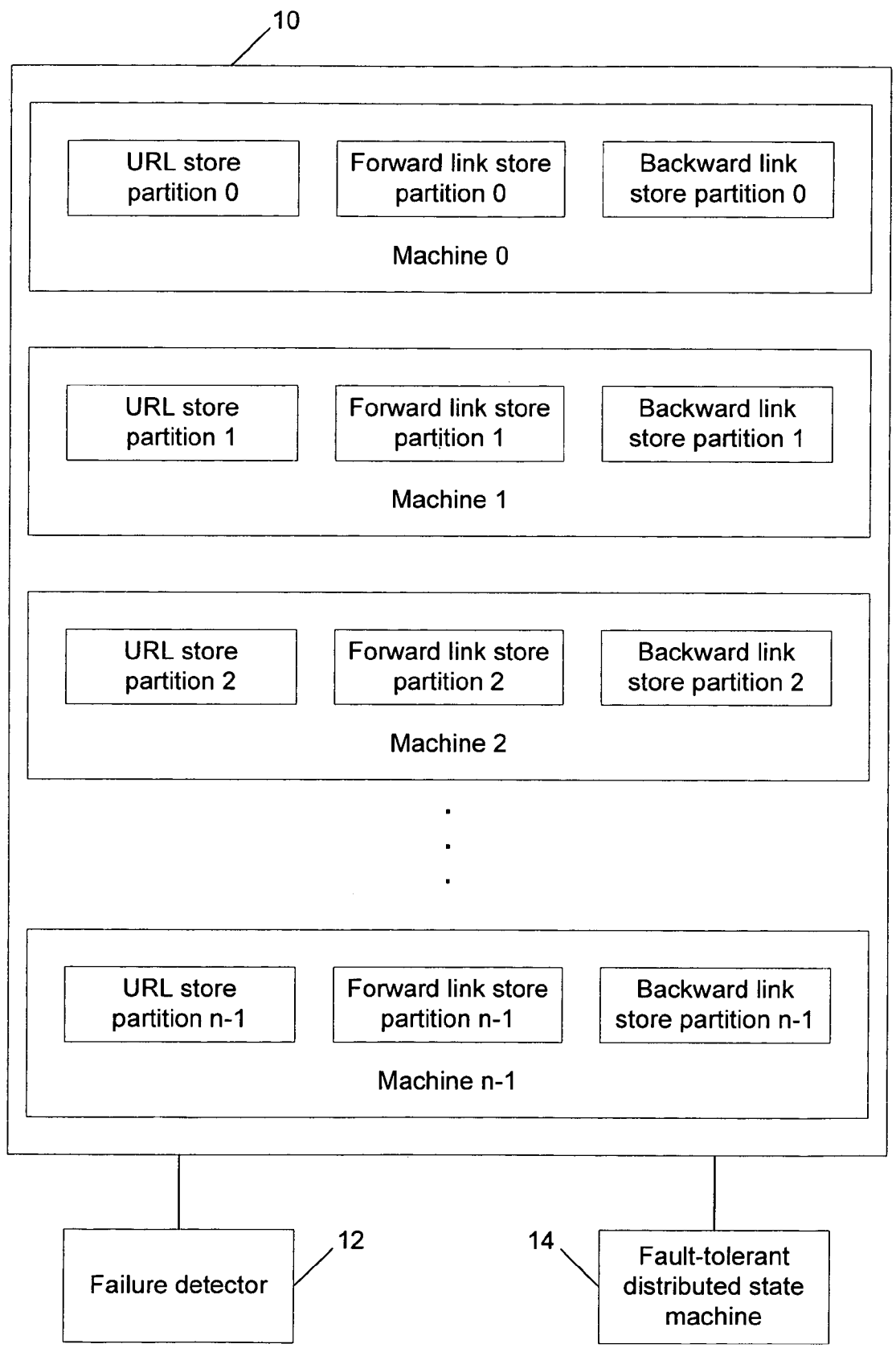
FIG. 2 is a more detailed block diagram of the example system of FIG. 1.

FIG. 2 is a more detailed block diagram of the example system of FIG. 1. A distributed database system 10 running on a cluster of machines, such as servers and/or database processors, for example, connected by a high speed network, is provided, and each of the three stores is partitioned across the machines or servers in the clusters. Assume that the cluster comprises n machines, numbered 0 to n−1. The URL, backward link, and forward link store partitions are numbered accordingly.

The distributed database system uses a hash function $H_n$ mapping host names to the integer range [0 ... n−1] to place URLs into URL store partitions. A URL u is placed in the URL store partition numbered $H_n(host(u))$. So all URLs belonging to a particular host (web server) are placed in the same URL store partition. Furthermore, a simple hash function application may be used to determine which URL store partition contains a particular URL.

Figure 3:
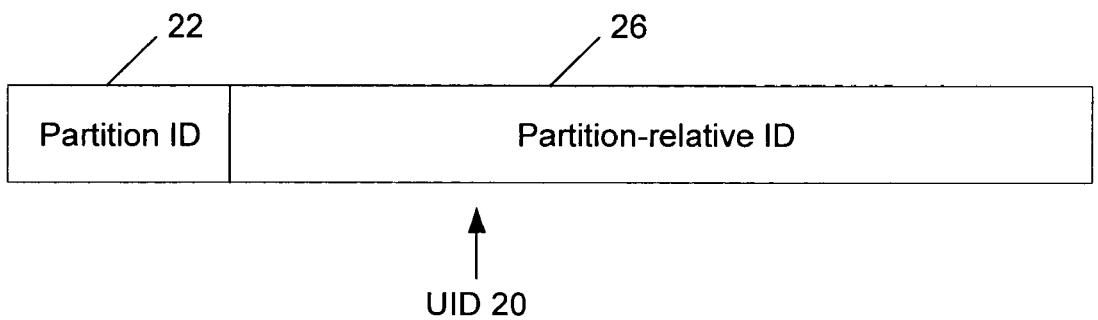
FIG. 3 is a diagram of an example unique identifier (UID) format.

An example UID format is shown in FIG. 3. The most significant few (e.g., 8) bits of a UID 20 encode the identity of the store partition containing the corresponding URL as a partition ID in portion 22. The remaining bits encode a number that is unique relative to that partition as a partition-relative ID in portion 26.

For example, given a URL http://xyz.com/a/b and assuming that $H_n(xyz.com)$ is 17, this URL is placed in URL store partition 17 on machine 17 of the cluster of machines, and the highest few bits, corresponding to portion 22 in FIG. 3, of the corresponding UID encode the number 17. So given a UID, it is straightforward to determine the URL store partition that maintains the mapping between this UID and its corresponding URL.

The partition-relative ID is drawn from a densely packed space, by sorting all URLs placed in a given URL store partition in lexicographic order and using their position in that ordering as the partition-relative identifier. So all UIDs referring to web pages on the same host desirably occupy a densely populated numeric interval, with no UID referring to a web page on a different host falling into that interval.

Both the forward link store and the backward link store implement mappings from UIDs to lists of UIDs. The forward link store maps a UID u to the list of UIDs linked to by u, and the backward link store maps a UID u to the list of UIDs linking to u. Both stores are partitioned according to the partition ID of u (that is, the UID that is the argument to the mapping). Given a UID u whose partition ID is x, partition x of the forward link store contains the mapping of u to the pages u links to, and partition x of the backward link store contains the mapping of u to the pages linking to u.

Clients of a distributed database system hash the host component of a URL or extract the partition ID of a UID in order to determine which machine in the cluster to contact, and then send their UrlToUid, UidToUrl, or GetLinks requests to the appropriate machine.

The URL store maintains a bijective mapping between string-typed URLs and integer-typed UIDs. Such a data structure may be realized in several ways, including maintaining a hash table mapping URLs to UIDs, and a second table mapping UIDs back to URLs; or by using a data structure that keeps the URL/UID pairs in sorted order, and performing both URL-to-UID and UID-to-URL mappings using this single data structure. Examples of such data structures include binary search trees, B-trees, and sorted lists of URL/UID pairs.

Here, the URL store is desirably maintained as a sorted list of URL/UID pairs because this implementation is space-efficient and efficient memory utilization is desirable.

A current URL store implementation uses slightly less than 15 bytes per URL, and is very space-efficient. It achieves this space-efficiency by using the following techniques. It keeps the URLs in lexicographic sorted order, thereby opting for a search-based as opposed to a hash-based URL lookup scheme. It replaces the prefix of a URL that is common with the prefix of the previous URL by the length of that shared prefix. This technique is beneficial because the URLs are stored in lexicographically sorted order, and therefore tend to have substantial shared prefixes. The store implementation does not store the UID explicitly; instead, UIDs are implied by the position of the URL in the list. This means that the numbering of UIDs reflects the lexicographic ordering of URLs; URLs that belong to the same host will have UIDs that are numerically close. It linearizes the URL list in memory, thereby avoiding any pointer overhead. In addition to the URL store, SHS maintains two other main stores as noted above: a forward link store and a backward link store.

A link store is a mapping from UIDs to lists of UIDs. Any implementation of link stores should provide a time-efficient method for mapping UIDs to lists, and it should represent the mapping in a space-efficient form. Link stores could be realized as hash tables, search trees (e.g. binary search trees or B-trees), or sorted lists. Sorted lists are very space-efficient, and are used herein. Link stores are represented as follows. A link store consists of a sequence of UID-to-UID-list records. The sequence is linearized in memory, i.e., there are no pointers (and thus no space overhead due to pointers). The records may have varying lengths, so it is not straightforward to locate the nth record. The UIDs (the keys of the mapping) are arranged in a numerically sorted order. Because UIDs indicate the position of a URL in the URL store, the set of UIDs forms an uninterrupted interval. Because the UID of each record can be inferred from the position of each record in the link store, the UID can be omitted.

The system maintains an index on the side that records the beginning of every kth record in the link store (k is fixed, typical values range from 10 to 1000). In order to locate a particular UID-to-UID-list record r in the link store, the system consults the index to determine the beginning of the closest record ahead of r in the store, and then sequentially reads through the link store to retrieve r. A UID-list consists of a number indicating the number of elements in the list, followed by the UIDs. Instead of storing absolute UIDs, each UID x is represented by the difference ("gap") between x and its predecessor in the list. As a special case, the first UID x is represented in the list as the difference between x and the (implicit and omitted) UID that is the key of that record. This encoding is known in the art as "gap encoding". Since the UID-list is arranged in sorted order, all but the first gap in the list are positive.

As mentioned above, UIDs reflect the position of URLs in the URL store, which is kept in lexicographic sorted order. Hence, URLs belonging to the same host will have UIDs that are numerically close, which means that the difference between two such UIDs will be small. On average, over 80% of all hyperlinks on a web page point to other web pages on the same host. So, the gap values in UID-lists tend to be numerically small. This property may be exploited by employing variable-length number encoding schemes such as variable-byte-length codes, variable-nybble-length codes, Huffmann codes, or arithmetic codes. The choice of coding scheme reflects a trade-off between space-efficiency and time-efficiency—e.g., arithmetic codes are highly space-efficient, but expensive to decode, while variable-byte-length codes are less space-efficient, but also much faster to decode.

Using variable-nybble-length codes and an index entry for every $32^{nd}$ record, a forward link can be represented using about 2 bytes and a backward link using about 2.75 bytes. In other words, the 8-byte UIDs representing forward and backward links may be compressed by 75% and 66%, respectively.

The corpus of most major search engines changes continuously. For example, MSN Search crawls about 500 million web pages per day and incorporates these updates into the index. Some of these pages will not have been in the index before, while others will have been re-crawled. Because the update frequency of web pages is fairly high, the hyperlinks of a substantial fraction of the re-crawled pages will have changed. It is desirable that a timely view of the web graph is presented. Continuous crawling can change the search engine's view of the web graph as new pages are discovered, as pages should be deleted, as links should be added, etc.

Supporting update operations is described in U.S. patent application Ser. No. 11/408,283, filed Apr. 19, 2006, entitled "Incremental update scheme for hyperlink database", and incorporated herein by reference in its entirety. In addition to a database update mechanism, U.S. patent application Ser. No. 11/408,283 also describes an example distributed hyperlink database, such as a scalable hyperlink store or SHS, and its basic data structures.

The number of machines in a cluster of computers running a distributed database may be changed. As described herein, the database update mechanism may be leveraged to change the number of machines in a distributed database.

When operating a hyperlink database such as an SHS in a production setting, it is desirable to have the ability to dynamically grow the size of the computing cluster running the SHS. For example, a search engine might desire to index a much larger portion of the web, meaning that the size of the induced web graph would grow. Because SHS maintains the web graph in memory, distributed over a cluster of computers, the number of machines in that cluster would grow to accommodate the larger graph. Growing an SHS cluster includes provisioning new machines, and storing a portion of the web graph maintained by the SHS on those new machines.

A database is partitioned across some number of machines. As the number of machines is increased (or decreased) in the database, new data will be partitioned across the increased (or decreased) number of machines. The data is distributed across the machines, but not all at once (i.e., spread over time).

Assume that x new machines are added to an existing cluster of n SHS servers. To populate the x new machines with data, the existing SHS stores are not repartitioned across the extended cluster, but instead new stores are partitioned across the extended cluster, and the reach of the repartitioning is gradually extended as existing and new stores are merged, for example as described in U.S. patent application Ser. No. 11/408,283. It is computationally inexpensive, and as stores are merged, the SHS database is partitioned in a way that makes efficient use of the available hardware. This approach can also deal with the inverse scenario, where the number of machines in the SHS cluster is decreased, not increased.

It is now described how new stores, resulting from updates to the graph, are partitioned across the changed set of SHS servers, how the methods UrlToUid, UidToUrl, and GetLinks are impacted, and how stores are merged.

Figure 4:
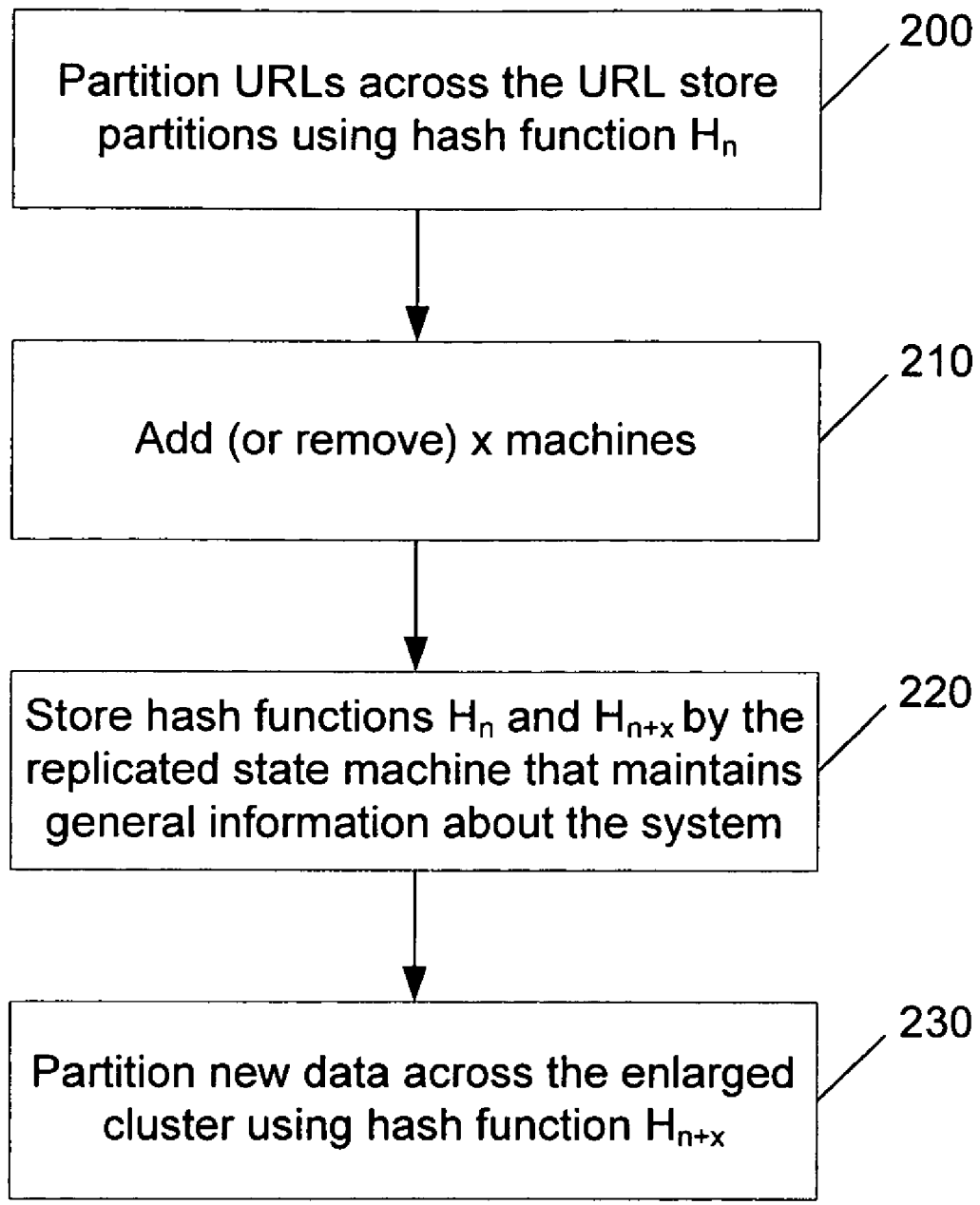
FIG. 4 is a flow diagram of an example method of changing the number of machines in a cluster of SHS servers.

FIG. 4 is a flow diagram of an example method of changing the number of machines in a cluster of SHS servers. Assume an existing SHS cluster of n machines. At step 200, URLs are partitioned across the URL store partitions of the SHS cluster using a hash function $H_n$ that maps URLs to partition IDs 0 to n−1. At step 210, x machines are desired to be added (or removed, if x is negative) to the cluster. In order to partition new data across the enlarged cluster, a new hash function $H_{n+x}$ is introduced. The old and new hash functions are stored by the replicated state machine that maintains general information about the system, at step 220, and are known to both SHS servers and SHS clerks which communicate with the SHS servers on behalf of client applications. URLs are mapped to partition IDs 0 to n+x−1, at step 230, using the new hash function.

In other words, $H_n$ is a hash function that maps URLs across n machines, by hashing the host component of the URL. If x new machines are added to the n machines, $H_{n+x}$ is used, which hashes data over the new enlarged cluster of machines. This is used to build new stores. When the number of machines is decreased, the hash function $H_{n+x}$ is also used, with x being a negative number. $H_n$ is used to search old stores, and $H_{n+x}$ is used to search the new stores. Merging is performed to get rid of $H_n$.

Figure 5:
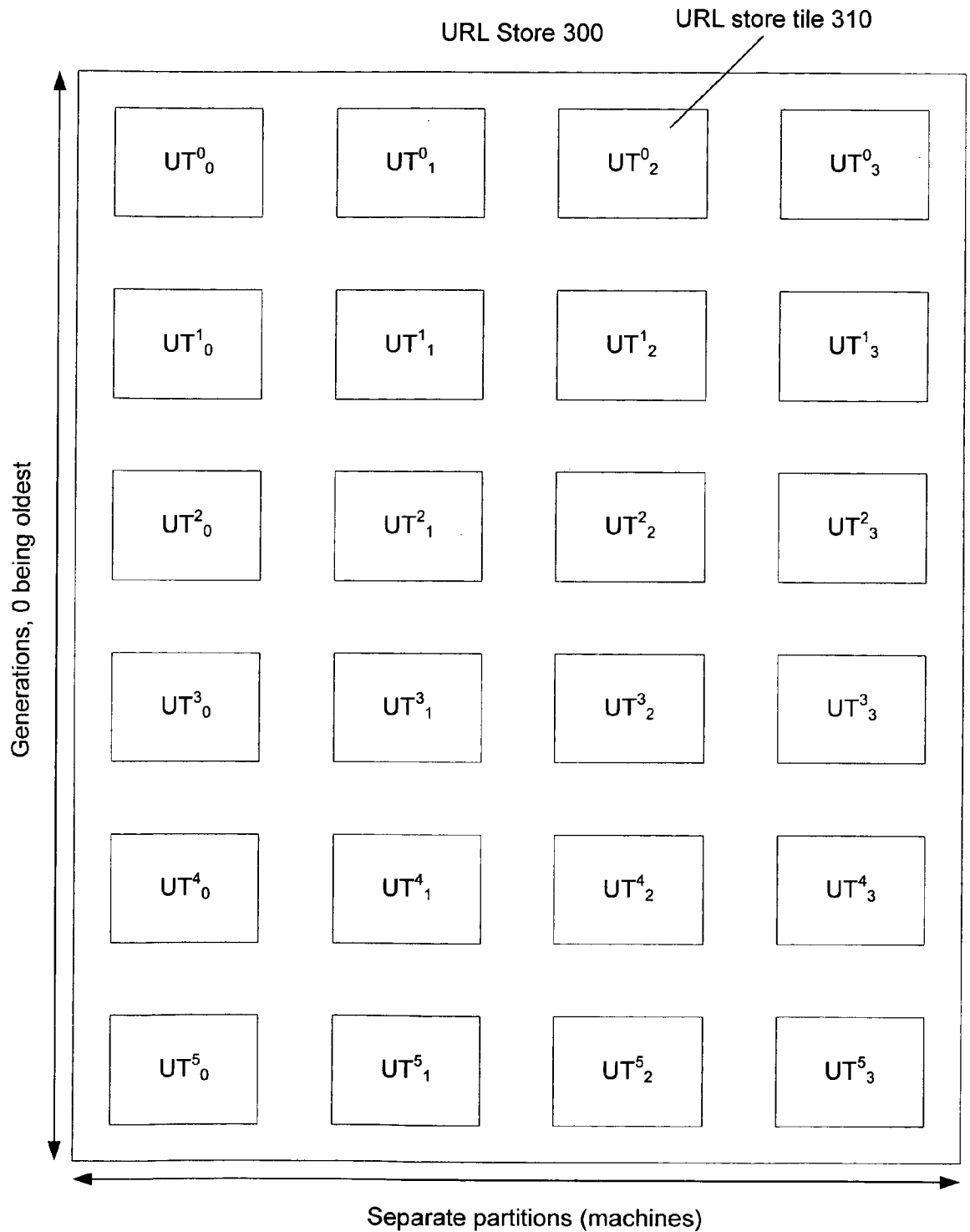
FIG. 5 is a diagram of an example URL store that is segmented in two dimensions.

As described above, an SHS database consists of three stores: a URL store that maintains a bijection between URLs and UIDs, a forward link store that captures hyperlinks, and a backward link store that captures reversed hyperlinks. Each store is segmented in two dimensions as shown in FIG. 5: it is partitioned across the n machines of the SHS cluster, and it consists of multiple generations or vintages. A URL store 300 is shown in FIG. 5, and a forward link store and a backward link store would look similar.

A URL store segment is referred to as a URL store tile 310, and $UT^g_p$ denotes the URL store tile for generation g in partition (machine) p. Similarly, $FT^g_p$ denotes the forward link store tile for generation g in partition p, and $BT^g_p$ denotes the backward link store tile for generation g in partition p.

Figure 6:
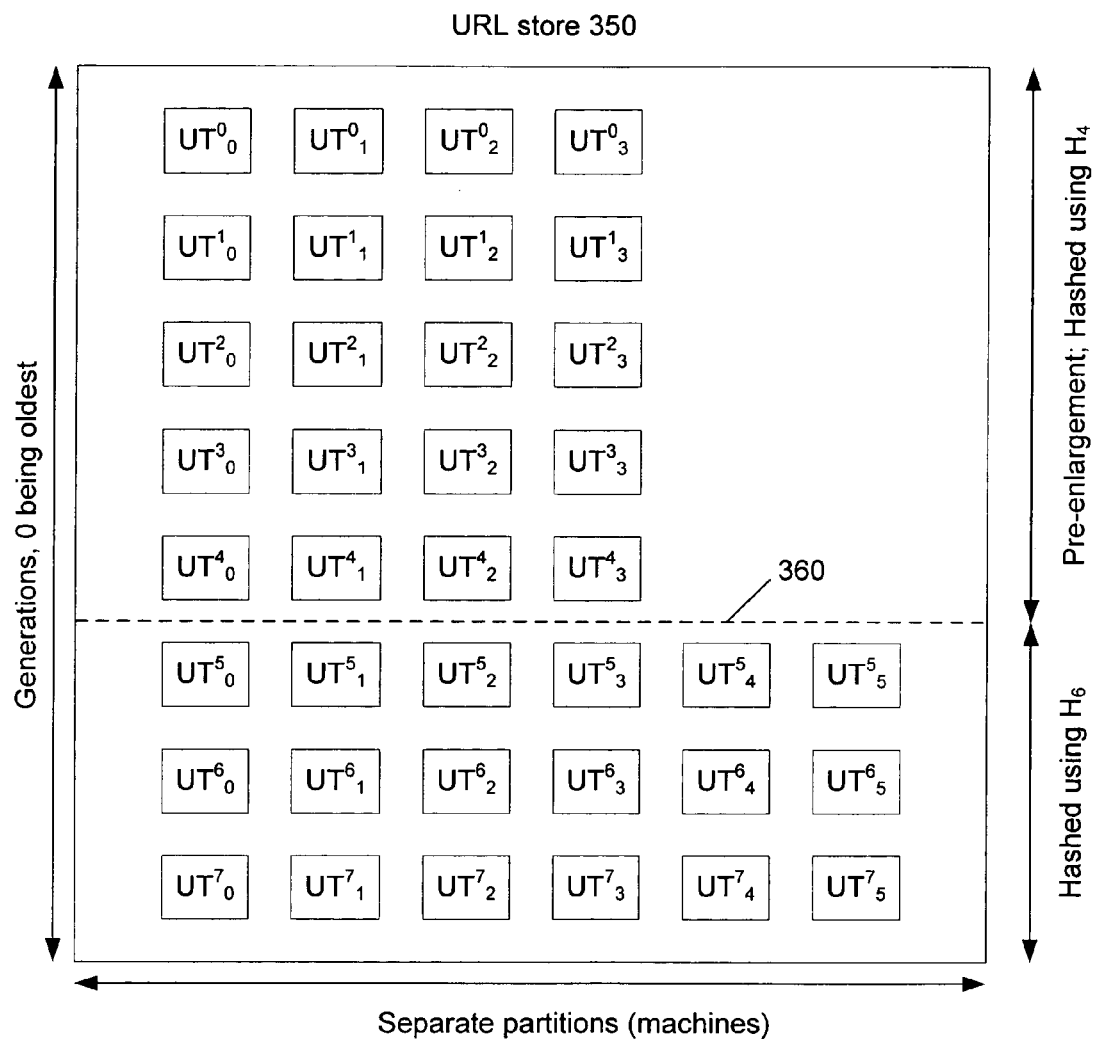
FIG. 6 is a diagram of an example URL store in which updates are distributed across the machines in an enlarged cluster.
Figure 7:
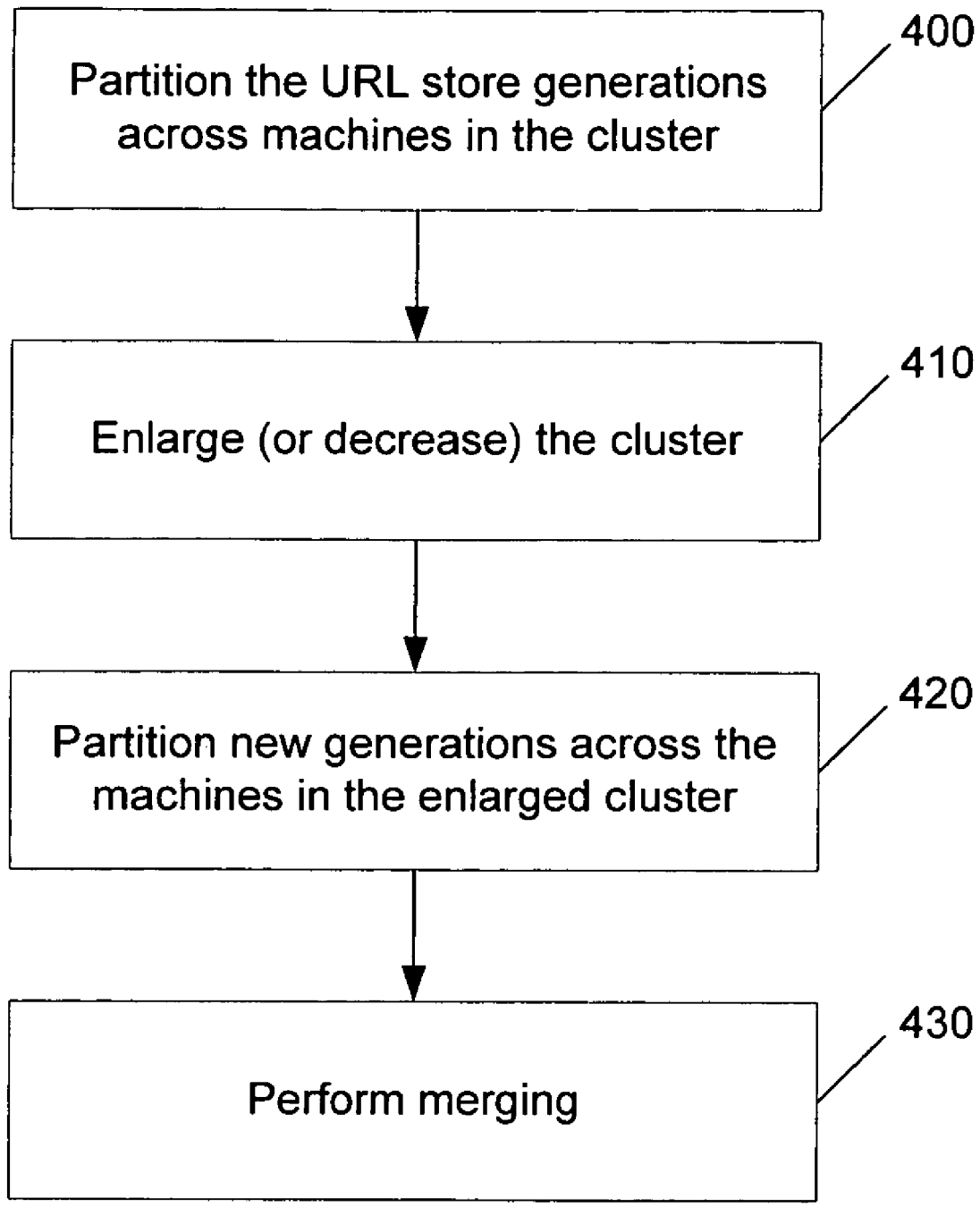
FIG. 7 is a flow diagram of an example method in which updates are distributed across the machines in an enlarged cluster.

Updates to the web graph (e.g., as a result of crawling the web continuously) are incorporated into the SHS database in the form of new URL and link store tiles. Updates arriving after the cluster has been grown are partitioned using the new hash function $H_{n+x}$, and thus are distributed evenly across all machines in the enlarged (or shrunken) cluster. FIG. 6 illustrates this for a URL store 350, and FIG. 7 is a flow diagram of an example method.

In FIG. 6, the cluster is enlarged from four to six machines. The first five generations of the URL store (generations 0 through 4) are partitioned across four machines (numbered 0 through 3) at step 400 as shown in FIG. 7, the cluster is enlarged at step 410, and the subsequent three generations (generations 5 through 7) are partitioned across six machines at step 420.

As more generations are added, merging is performed at step 430. Merging may take place below the dashed line 360 in FIG. 6, or merging may take place using tiles above the dashed line 360. The database gets enlarged to have more machines, with the dotted line being pushed up, one generation at a time, shifting the dotted line 360 up one level. As this is being performed, the data in that generation row is rehashed. This is performed for all the rows over time, desirably whenever a normal merger (update) occurs.

Figure 8:
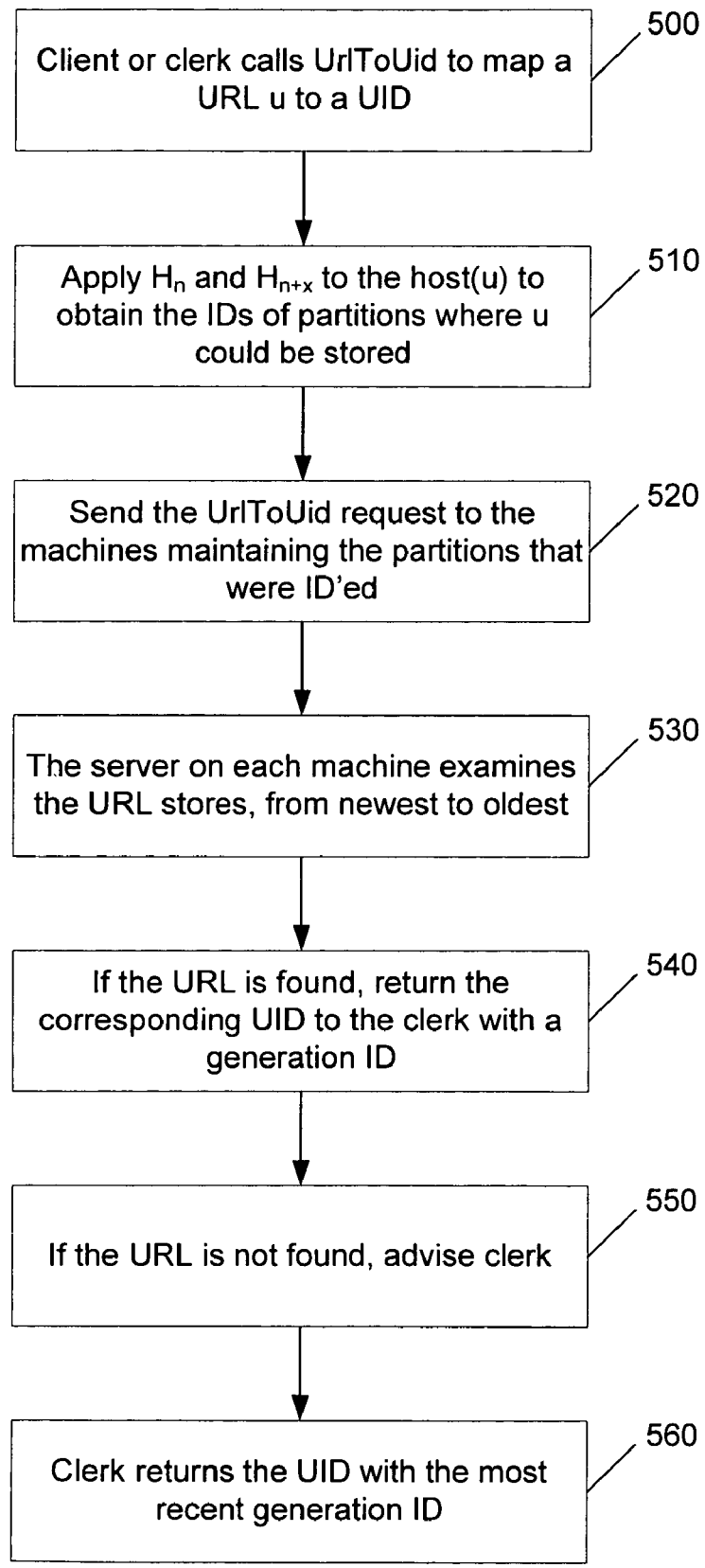
FIG. 8 is a flow diagram of an example URL to UID process.

FIG. 8 is a flow diagram of an example URL to UID process. At step 500, a client calls the UrlToUid method to map a URL u to a UID. The client application (or its clerk) applies both $H_n$ and $H_{n+x}$ to the host(u), at step 510, to obtain the IDs of all partitions where u could potentially be stored, and then sends the UrlToUid request to the machines maintaining these partitions, at step 520. At step 530, the SHS server on each machine examines the URL store tiles on that machine, starting with the newest URL store tile and progressing to increasingly older tiles. If it finds the URL, it returns the corresponding UID to the clerk, at step 540, together with a generation or vintage ID. If all stores have been examined and the URL was not found in any of them, the SHS server reports this back to the clerk, at step 550. The clerk desirably waits until both SHS servers have responded to its request, and then returns the UID with the most recent generation ID, at step 560.

Figure 9:
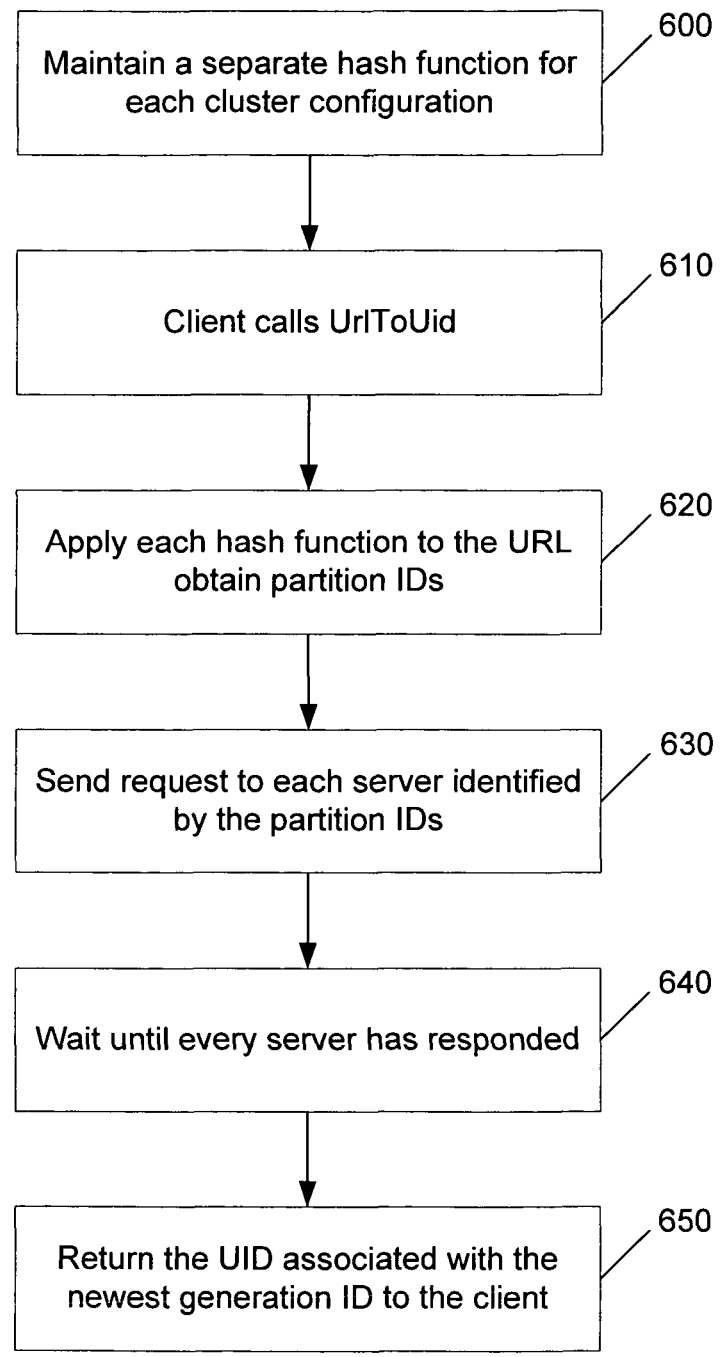
FIG. 9 is a flow diagram of an example URL to UID process in which the number of machines in the cluster has been changed multiple times.

This technique generalizes to the scenario where the number of machines in the cluster has been changed multiple times, as described with respect to FIG. 9. In this scenario, the clerks maintain a separate hash function for each cluster configuration, at step 600. A client calls UrlToUid at step 610. At step 620, the clerk applies each hash function to the URL to obtain partition IDs, and sends the request to all SHS servers identified by the partition IDs at step 630. The clerk waits until every server has responded at step 640, and then at step 650, returns the UID associated with the newest generation ID to the client.

As an optimization, the clerk can return a result to the client as soon as it has received a positive result from an SHS server and all SHS servers responsible for younger generations have responded negatively. In other words, the clerk does not need to wait until the SHS servers responsible for older generations have responded.

This technique can accommodate URL deletions. It is possible for a URL to have been added to the store in a generation, deleted in a subsequent generation, and re-added in a yet later generation. Because the clerk does not return a result to the client until the URL was found, deleted or not, in a generation and was not found in subsequent generations, the clerk is guaranteed to return the correct result.

Thus, for URL to UID, instead of probing one machine, multiple machines are probed for each lookup request. The operations of the UidToUrl and GetLinks methods do not differ from the operation described in U.S. patent application Ser. No. 11/408,283, because these methods take a UID as an argument, and a UID contains the identity of the SHS server responsible for it (the partition ID portion of the UID).

The three different kinds of tiles associated with a particular generation g and partition p have a shape. FIGS. 10, 11, and 12 show the content (explicit and implicit) of the URL store tiles, the forward link store tiles, and the backward link store tiles, respectively.

In FIG. 10, the URL store tile $UT^g_p$ contains a sequence of URLs, sorted in lexicographic order. The associated UIDs are not stored explicitly, but can be computed from the position of a URL in the tile and the base UID of the tile. The notation number(g,p) denotes the number of URLs in $UT^g_p$, and baseuid(g,p) denotes the base UID of URL store tile $UT^g_p$, that is, the UID corresponding to the first URL in $UT^g_p$. Base UIDs can be assigned in many ways. An example method is to set baseuid(0,p) to the UID with partition ID p and partition-relative ID 0 (using the terminology of FIG. 3), and to set baseuid(g+1,p) to baseuid(g,p)+number(g,p), thereby ensuring that the UID ranges associated with URL store tiles are non-overlapping, and that the numeric order of the UIDs within a partition reflects their temporal order, with UIDs belonging to older generations having lower numeric values. The entire table of base UIDs is quite compact; assume that every SHS server stores a local copy of the table. This enables every SHS server to easily determine the generation of a UID u with partition ID p: generation(u)=g if and only if baseuid$(g,p) \leq u <$ baseuid(g,p)+number(g,p) (which is baseuid(g+1, p), if the above method of assigning base UIDs is used).

Both the forward and the backward link store tiles, as shown in FIGS. 11 and 12 respectively, contain a mapping from UIDs to lists of UIDs. Each tile comprises a sequence of records, and each record denotes a mapping from a "key" UID to a list of "value" UIDs. In the context of the forward link store, the key UID denotes a linking web page, and the values denote the pages being linked to. In the context of the backward link store, the key UID denotes a linked-to web page, and the values denote the linking web pages. Since store generations reflect updates to the hyperlink database resulting from a web crawler crawling some new pages and possibly recrawling pages that had been crawled previously (and thus have URLs stored in previous generations of the URL store), both key and value UIDs in each link store tile may belong to the generation of that tile or an earlier generation (they cannot belong to a later generation, since tiles are not updated once they have been created). Since the records in a link store tile are sorted by key, each link store tile will contain 0 or more records whose key UIDs belong to previous generations (these records may be referred to as the "prefix" of the tile), followed by a number of records whose keys belong to the current generation (these records may be referred to as the "suffix" of the tile). In an example embodiment, the suffix contains exactly one record for each URL in the corresponding URL store tile; in this embodiment, the key UIDs of records in the suffix may be omitted, since they can be readily inferred. The key UIDs of the prefix of the tile, while sorted, are typically not in contiguous order, and thus are stored explicitly.

Figure 13:
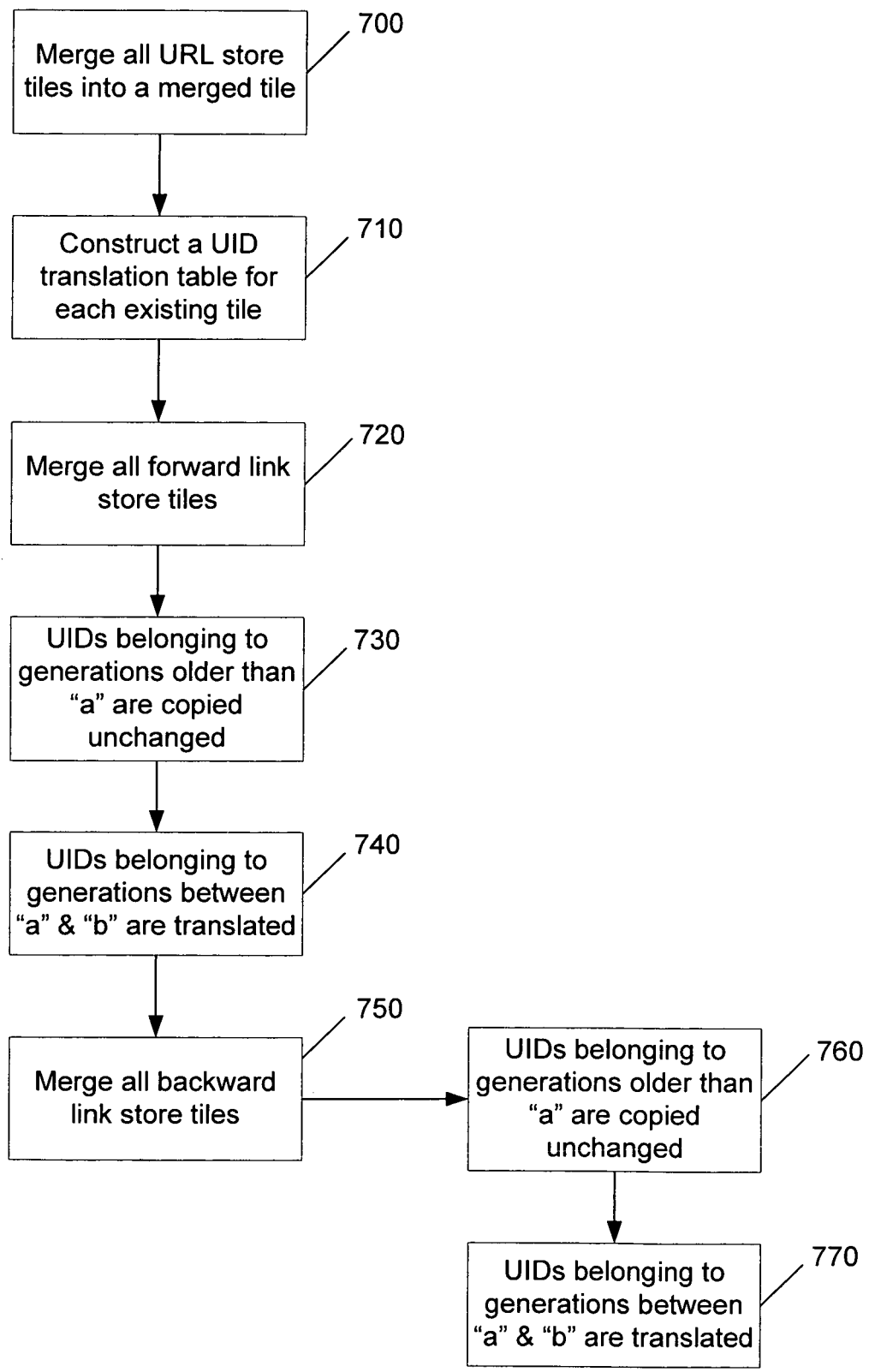
FIG. 13 is a flow diagram of an example method of merging a chain of store tiles that are partitioned using the same hash function.

Merging a chain of store tiles (spanning a contiguous series of generations starting at generation a and up to and including the current, youngest generation b, and producing a new generation a*) is described herein. If all stores to be merged are partitioned using the same hash function, translation tables are built up and the merge is performed as described in U.S. patent application Ser. No. 11/408,283, and set forth as follows with respect to FIG. 13.

(1) Regarding merging the URL store at step 700, each SHS server p merges all URL store tiles $UT^g_p$ ($a \leq g \leq b$) in the chain into a merged tile $UT^{a*}{}_p$. Because each tile contains URLs in sorted order, merging tiles requires only a sequential pass through the existing tiles. As URLs from the existing tiles are copied to the new merged tile, a UID translation table $TT^g{}_p$ is constructed for each existing tile at step 710. A UID translation table has one entry for each URL in the corresponding URL store tile, containing the new UID (i.e., the position in the merged tile plus the base offset of the merged tile) of that URL. Putting it differently, if slot i of $UT^g{}_p$ contains a URL u ($UT^g{}_p[i]=u$) and that URL u ends up in slot j in the merged tile ($UT^{a*}{}_p[j]=u$), then the new UID of u is baseuid(a*,p)+j, and $TT^g{}_p[i]$ will contain baseuid(a*,p)+j.

(2) Regarding merging the forward link store at step 720, each SHS server merges all forward link store tiles in the chain. Again, merging tiles involves a sequential pass through the existing tiles. UIDs belonging to generations older than a are copied unchanged at step 730, while UIDs belonging to generations between a and b are translated at step 740, because the URL to UID mapping of these generations has changed. This translation is desirably performed using the UID translation tables. For the majority of UIDs, tables local to the SHS server can be consulted. However, some fraction of UIDs (e.g., about 20%) are maintained by other SHS servers, and these servers have the corresponding UID translation tables. Rather than replicating every translation table on every server, the SHS server may request the translated UID from the peer SHS server responsible for the UID. Requests desirably are batched up to amortize the overhead of remote procedure calls.

(3) Regarding merging the backward link store at step 750, each SHS server merges all backward link store tiles in the chain. Again, merging tiles involves a sequential pass through the existing tiles. UIDs belonging to generations older than a are copied unchanged at step 760, while UIDs belonging to generations between a and b are translated in the same manner as in (2) above at step 770.

Figure 14:
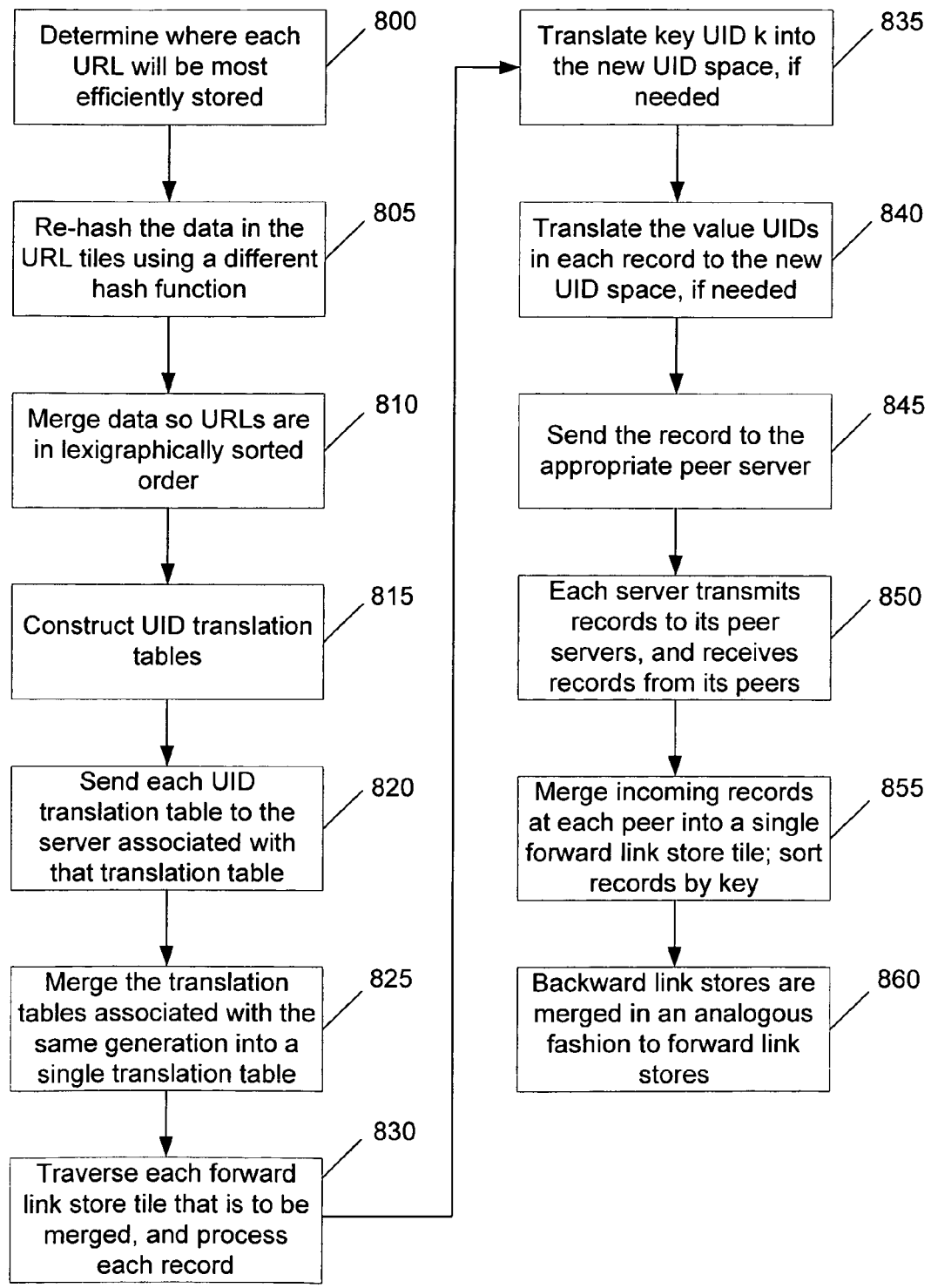
FIG. 14 is a flow diagram of an example method of merging a chain of store tiles that are partitioned using multiple hash functions.

However, if the tiles-to-be-merged were partitioned using multiple hash functions, they are repartitioned using the most recent hash function $H_{n+x}$ as follows and described with respect to FIG. 14. As a merge is being performed, re-mapping occurs over a larger set of machines. It is determined if the merge goes over the boundary at which the cluster was enlarged.

(1) At step 800, it is determined where each URL should be stored. Each SHS server p traverses each URL store tile $UT^g{}_p$ ($a \leq g \leq b$) that is to be merged and a repartitioning table $RT^g{}_p$ is built that captures where each URL in $UT^g{}_p$ should be repartitioned to:

$RT^g{}_p[i]:=H_{n+x}(host(UT^g{}_p[i]))$ for all slots $i$ in $UT^g{}_p$.

As an optimization, a tile $UT^g{}_p$ belonging to a generation g that is already partitioned using hash function $H_{n+x}$ (e.g., the most recent generations) does not need to be repartitioned, and the entries in the tile's repartitioning table can be set to:

$RT^g{}_p[i]:=p$ for all slots $i$ in $UT^g{}_p$.

since $H_{n+x}(host(UT^g{}_p[i]))$ is known to be p. Generation g may be referred to as an "unaffected generation".

(2) The data in the URL tiles are re-hashed using a different hash function, at step 805. Each SHS server p traverses each URL store tile $UT^g{}_p$ ($a \leq g \leq b$) that is to be merged and sends each URL $UT^g{}_p[i]$ to the SHS server identified by $RT^g{}_p[i]$. Each SHS server p stores the received URLs into new temporary URL store tiles $UT^g{}_{p,p'}$ identified by the identity of the sending SHS server p' and the generation g of the tile from which the URL originated. Note that the content of URL store tiles belonging to unaffected generations does not need to be sent to other servers. The tile $UT^g{}_p$ can be used as the temporary tile $UT^g{}_{p,p}$, and the other temporary tiles $UT^g{}_{p,p'}$ ($p \neq p'$) can be set to empty.

(3) Now that the data has been re-hashed onto new machines, the data is merged so that the URLs are in lexicographically sorted order, at step 810. Each SHS server p merges all the temporary tiles $UT^g{}_{p,p'}$ ($a \leq g \leq b$, $0 \leq p' < n$) into a single merged tile $UT^{a*}{}_p$, and as it does so, constructs UID translation tables, one for each temporary tile, at step 815. Each UID translation table $TT^g{}_{p,p'}$ is associated with the SHS server p' that sent the URLs in the corresponding temporary tile $UT^g{}_{p,p'}$. $TT^g{}_{p,p'}[i]$ is set to j if and only if $UT^g{}_{p,p'}[i]=UT^{a*}{}_p[j]$. Note that the UID translation tables $TT^g{}_{p,p'}$ capture how the URLs in $UT^g{}_{p,p'}$ were interleaved into $UT^{a*}{}_p$. Also note that for unaffected generations, the translation tables $TT^g{}_{p,p'}$ ($p \neq p'$) will be empty, since the temporary URL store tiles $UT^g{}_{p,p'}$ ($p \neq p'$) are empty.

(4) At step 820, each SHS server p sends each of its UID translation tables $TT^g{}_{p,p'}$ to the SHS server p' associated with that translation table. Server p' sent the original URLs in $UT^g{}_{p,p'}$ and is now the receiver of the URL translation table $TT^g{}_{p,p'}$. At step 825, the receiving SHS server p' merges all translation tables $TT^g{}_{p,p'}$ ($0 \leq p < n$) associated with the same generation g into a single translation table $TT^g{}_{p'}$, interleaving the entries of the tables $TT^g{}_{p,p'}$ using the repartitioning table $RT^g{}_{p'}$. This may be done by placing pointers at the beginning of each table $TT^g{}_{p,p'}$, and then iterating over all slots i in the repartitioning table, from first to last. If $RT^g{}_{p'}[i]=p$, then set $TT^g{}_{p'}[i]$ to the value marked by the pointer in $TT^g{}_{p,p'}$ and advance the pointer. At the completion of this merge, $TT^g{}_{p'}[i]$ will contain the new UID corresponding to URL $UT^g{}_{p'}[i]$, for each i. Note that for every unaffected generation, translation tables need to be neither transmitted nor merged. The translation table $TT^g{}_{p',p'}$ becomes $TT^g{}_{p'}$.

(5) Recall that a forward link store tile comprises a sequence of records, each record having a "key" UID k and a list of "value" UIDs $v_1, \ldots, v_z$. (For some records, e.g., records in the suffix of a tile, the key UID might not be stored explicitly, but can be computed.) Each SHS server p traverses each forward link store tile $FT^g{}_p$ ($a \leq g \leq b$) that is to be merged, and processes each record $k \rightarrow v_1, \ldots, v_z$, at step 830, as follows in more detail. At step 835, it determines whether key UID k should be translated into the new UID space. To that end, it sets g' to be generation(k). If g'<a (i.e., k belongs to a generation that is outside the scope of this merge), k does not need to be translated. Otherwise, k is set to $TT^g{}_p[k-$baseuid(g', p)], involving a lookup in a UID translation table on the local server p (since the record is found on server p, partition(k) is guaranteed to be p). At step 840, it may be necessary to translate the value UIDs in each record to the new UID space. To this end, server p first computes the generation g' of each value UID $v_i$. If g'<a, $v_i$ does not need to be translated. Otherwise, it is translated by sending a request to the peer server p' identified by partition ($v_i$), which returns the translated UID $TT^{g'}{}_{p'}[v_i - $baseuid(g',p')]. Preferably, such requests are batched up to amortize the overhead of remote procedure calls and thus increase performance. At step 845, the record is sent to the peer server identified by partition(k). It is noted that there is a special case where partition(k)=p, i.e., the record does not need to be transmitted over the network.

(6) Each SHS server transmits records to its peer servers, and conversely receives records from its peers, at step 850. Records transmitted from one peer to another have monotonically increasing keys, and it is thus straightforward for the receiving peer p to merge all incoming records into a single new forward link store tile $FT^{a*}_p$ with records being sorted by key, at step 855.

(7) Backward link stores are desirably merged in an analogous fashion to forward link stores, at step 860.

Exemplary Computing Arrangement

Figure 15:
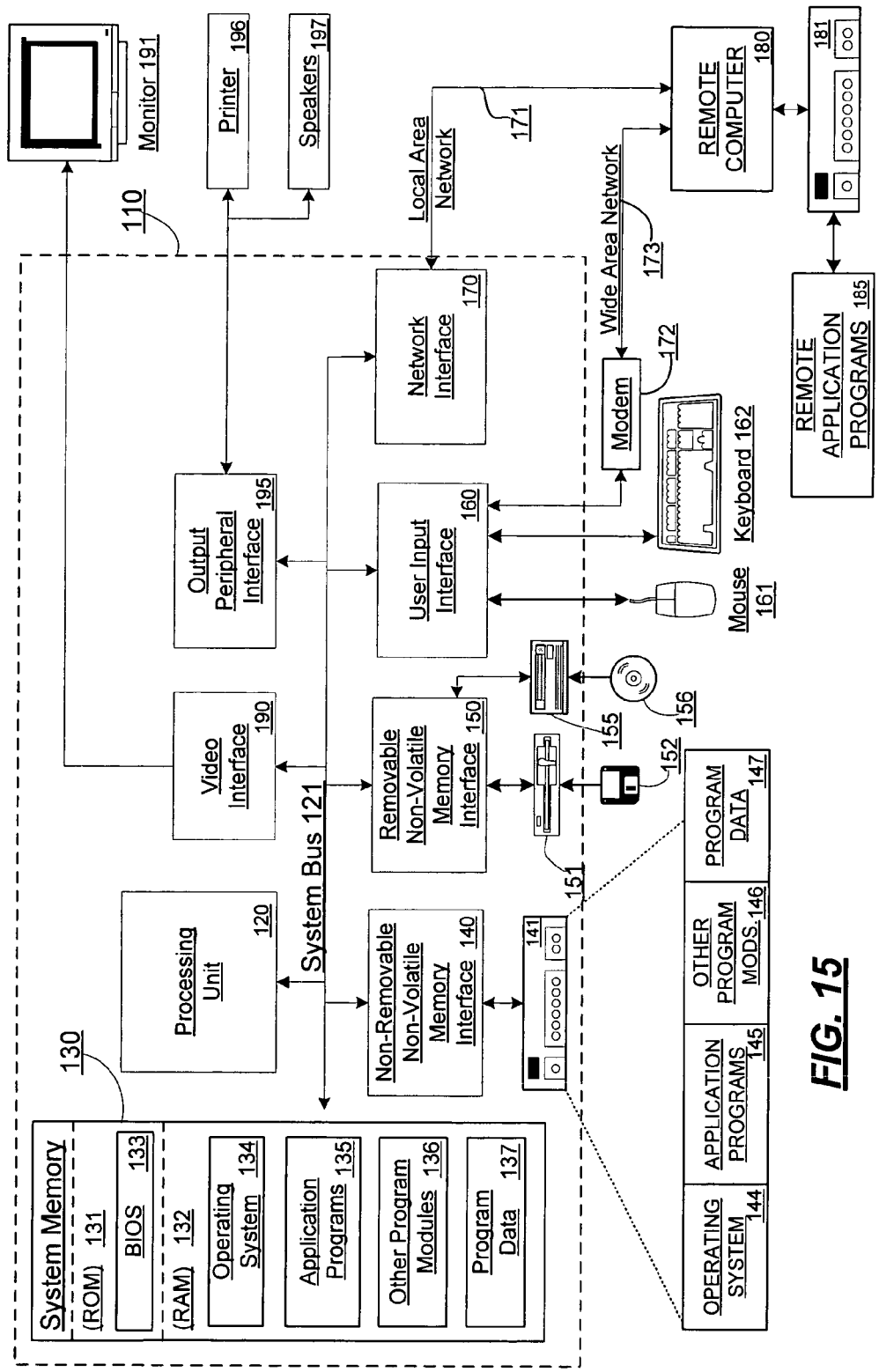
FIG. 15 is a block diagram of an example computing environment in which example embodiments and aspects may be implemented.

FIG. 15 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 15, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 15 illustrates operating system 134, application programs 135, other program modules 136, and program data 137.

The computer 110 may also include other removable/non-removable, volatile/nonvolatile computer storage media. By way of example only, FIG. 15 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 15, provide storage of computer readable instructions, data structures, program modules and other data for the computer 110. In FIG. 15, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad.

Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 15. The logical connections depicted in FIG. 15 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 15 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of maintaining a cluster of computers, comprising:
   operating a distributed database that maintains a web graph across the cluster of computers;
   determining a first computer of the cluster of computers in which to store a first update to the web graph based on processing the first update with a first hash function, the first hash function being configured to determine an indication of n indications, wherein n is the number of computers in the cluster of computers;
   storing an indication of the first update on the first computer;
   changing the number of computers in the cluster of computers to provide a changed cluster of computers;
   determining a second hash function in response to changing the number of computers, the second hash function being configured to determine an indication of n+x indications, where n+x is the number of computers in the changed cluster of computers;
   determining a second computer of the changed cluster of computers in which to store a second update to the web graph based on processing the second update with the second hash function;
   storing an indication of the second update on the second computer;
   sending a query to a first and a second computer of the cluster of computers, the query having been processed with the first hash function;
   sending the query to a first and a second computer of the changed cluster of computers, the query having been processed with the second hash function;
   receiving a first result of sending the query to the first and the second computer of the cluster of computers;
   receiving a second result of sending the query to the first and the second computer of the changed cluster of computers; and
   in response to determining that a time at which the first result was stored in the cluster of computers is more recent than a time at which the second result was stored in the changed cluster of computers, storing the first result in the memory.

2. The method of claim 1, wherein the distributed database comprises a hyperlink database.

3. The method of claim 1, wherein changing the number of computers comprises:
   provisioning additional computers and storing portions of the web graph on the additional computers.

4. The method of claim 1, wherein changing the number of computers comprises:
   decreasing the number of computers.

5. The method of claim 1, wherein storing the portion of the web graph across the changed cluster of computers by using at least a second hash function comprises:
   storing the portion of the web graph gradually over time.

6. The method of claim 5, wherein the web graph comprises existing data stores that are partitioned over the cluster of computers, and storing the portion of the web graph gradually over time comprises:
   receiving new data stores pertaining to the web graph and partitioning the new data stores across the changed cluster of computers.

7. The method of claim 1, further comprising:
   prior to changing the number of computers in the cluster of computers, partitioning a plurality of uniform resource locators (URLs) across the cluster of computers using the first hash function that maps the URLs to partition identifiers 0 to n−1, where n is the number of computers in the cluster.

8. The method of claim 7, further comprising:
   after changing the number of computers in the cluster of computers, using the second hash function to map additional URLs to partition identifiers 0 to n+x−1, where n+x is the number of computers in the changed cluster of computers.

9. The method of claim 1, wherein the result of sending the query to the first and the second computer of the cluster of computers comprises a result from each of the first and second computers of the cluster of computers with a most recent generation identifier, and wherein storing the result of sending the query to the first and the second computer of the cluster of computers with the query or sending the query to the first and the second computer of the changed cluster of computers in the memory comprises:
   storing the result of sending the query to the first computer of the cluster of computers before receiving the result from the second computer of the clusters of computers based on the result of sending the query to the first computer of the cluster of computers having a generation identifier that is newer than any generation identifier of a computer of the cluster of computers from which a result has not yet been received.

10. A system of maintaining a cluster of computers, comprising:

a processor; and a memory communicatively coupled to the processor when the system is operational, the memory bearing processor-executable instructions that, upon execution by the processor, cause the system to at least:

operate a distributed database that maintains a web graph across the cluster of computers;

determine a first computer of the cluster of computers in which to store a first update to the web graph based on processing the first update with a first hash function, the first hash function being configured to determine an indication of n indications, wherein n is the number of computers in the cluster of computers;

store an indication of the first update on the first computer;

change the number of computers in the cluster of computers to provide a changed cluster of computers;

determine a second hash function in response to changing the number of computers, the second hash function being configured to determine an indication of n+x indications, where n+x is the number of computers in the changed cluster of computers;

determine a second computer of the changed cluster of computers in which to store a second update to the web graph based on processing the second update with the second hash function;

store an indication of the second update on the second computer;

send a query to a first and a second computer of the cluster of computers, the query having been processed with the first hash function;

send the query to a first and a second computer of the changed cluster of computers, the query having been processed with the second hash function;

receive first result of sending the query to the cluster of computers;

receive a second result of sending the query to the changed cluster of computers; and in response to determining that a time at which the first result was stored in the cluster of computers is more recent than a time at which the second result was stored in the changed cluster of computers, storing the first result in the memory.

11. The system of claim 10, wherein the distributed database comprises a hyperlink database.

12. The system of claim 10, wherein the instructions that, upon execution by the processor, cause the system to at least change the number of computers further cause the system to at least:

provision additional computers and storing portions of the web graph on the additional computers.

13. The system of claim 10, wherein the instructions that, upon execution by the processor, cause the system to at least change the number of computers further cause the system to at least:

decrease the number of computers.

14. The system of claim 10, wherein the instructions that, upon execution by the processor, cause the system to at least change the portion of the web graph across the changed cluster of computers by using at least a second hash function further cause the system to at least:

store the portion of the web graph gradually over time.

15. The system of claim 14, wherein the web graph comprises existing data stores that are partitioned over the cluster of computers, and the instructions that, upon execution by the processor, cause the system to at least change the portion of the web graph gradually over time further cause the system to at least:

receive new data stores pertaining to the web graph and partitioning the new data stores across the changed cluster of computers.

16. A non-transitory computer-readable storage medium for maintaining a cluster of computers, bearing computer-readable instructions that, upon execution by a computer, cause the computer to perform operations comprising:

operating a distributed database that maintains a web graph across the cluster of computers;

determining a first computer of the cluster of computers in which to store a first update to the web graph based on processing the first update with a first hash function, the first hash function being configured to determine an indication of n indications, wherein n is the number of computers in the cluster of computers;

storing an indication of the first update on the first computer;

changing the number of computers in the cluster of computers to provide a changed cluster of computers;

determining a second hash function in response to changing the number of computers, the second hash function being configured to determine an indication of n+x indications, where n+x is the number of computers in the changed cluster of computers;

determining a second computer of the changed cluster of computers in which to store a second update to the web graph based on processing the second update with the second hash function;

storing an indication of the second update on the second computer;

querying the cluster of computers with a query, the query having been processed with the first hash function;

querying the changed cluster of computers with the query, the query having been processed with the second hash function;

receiving a first result of sending the query to the cluster of computers;

receiving a second result of sending the query to changed cluster of computers; and in response to determining that a time at which the first result was stored in the cluster of computers is more recent than a time at which the second result was stored in the changed cluster of computers, storing the first result in the memory.

17. The non-transitory computer-readable storage medium of claim 16, further bearing computer-readable instructions that, when executed on the computer, cause the computer to perform operations comprising:

prior to changing the number of computers in the cluster of computers, partitioning a plurality of uniform resource locators (URLs) across the cluster of computers using the first hash function that maps the URLs to partition identifiers 0 to n−1, where n is the number of computers in the cluster.

18. The non-transitory computer-readable storage medium of claim 17, further bearing computer-readable instructions that, when executed on the computer, cause the computer to perform operations comprising:

after changing the number of computers in the cluster of computers, using the second hash function to map additional URLs to partition identifiers 0 to n+x−1, where n+x is the number of computers in the changed cluster of computers.

* * * * *